United States Patent
Kim et al.

(10) Patent No.: US 7,117,515 B2
(45) Date of Patent: Oct. 3, 2006

(54) METHOD OF TRANSMITTING/RECEIVING ADDITIONAL INFORMATION

(75) Inventors: Ik Ju Kim, Kyonggi-do (KR); Young Tae Chung, Seoul (KR); Hyeong Ho Son, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/115,143

(22) Filed: Apr. 4, 2002

(65) Prior Publication Data

US 2002/0184628 A1  Dec. 5, 2002

(30) Foreign Application Priority Data

Apr. 6, 2001  (KR) .............................. 2001-18356

(51) Int. Cl.
*H04N 5/445* (2006.01)

(52) U.S. Cl. ........................................ 725/41; 725/54

(58) Field of Classification Search .................. 725/41, 725/42, 43, 44, 54
See application file for complete search history.

(56) References Cited

U.S. PATENT DOCUMENTS

| | | | |
|---|---|---|---|
| 6,419,137 B1* | 7/2002 | Marshall et al. | 225/41 |
| 6,453,471 B1* | 9/2002 | Klosterman | 725/41 |
| 6,615,039 B1* | 9/2003 | Eldering | 455/418 |
| 2001/0011372 A1* | 8/2001 | Lee | 725/39 |
| 2003/0133692 A1* | 7/2003 | Hunter | 386/35 |

OTHER PUBLICATIONS

Program and System Information Protocol for Terrestrial Broadcast and Cable, Dec. 23, 1997, ATSC, Doc. A/65.*

* cited by examiner

*Primary Examiner*—Chris Kelley
*Assistant Examiner*—James Sheleheda
(74) *Attorney, Agent, or Firm*—Birch, Stewart, Kolasch & Birch, LLP

(57) ABSTRACT

Disclosed is a method of transmitting/receiving additional information. The method includes the steps of transmitting video, audio, trailer, and EPG(program guide) signals respectively having independent PIDs(packet identification numbers), receiving the transmitted signals and extracting the video, audio, EPG, and trailer signals from the received signals, displaying the extracted EPG, and displaying the trailer signal for a selected broadcast program of the EPG. Preferably, the trailer is displayed as a motion picture or still image. Accordingly, when the audience selects a specific program on an EPG screen, the present invention displays a summary or preview of the selected program. Therefore, the transmitting side such as a broadcasting station enables to inform the audiences of the corresponding program of the broadcasting station, and the audiences are helped to select programs through program previews or summaries.

8 Claims, 3 Drawing Sheets

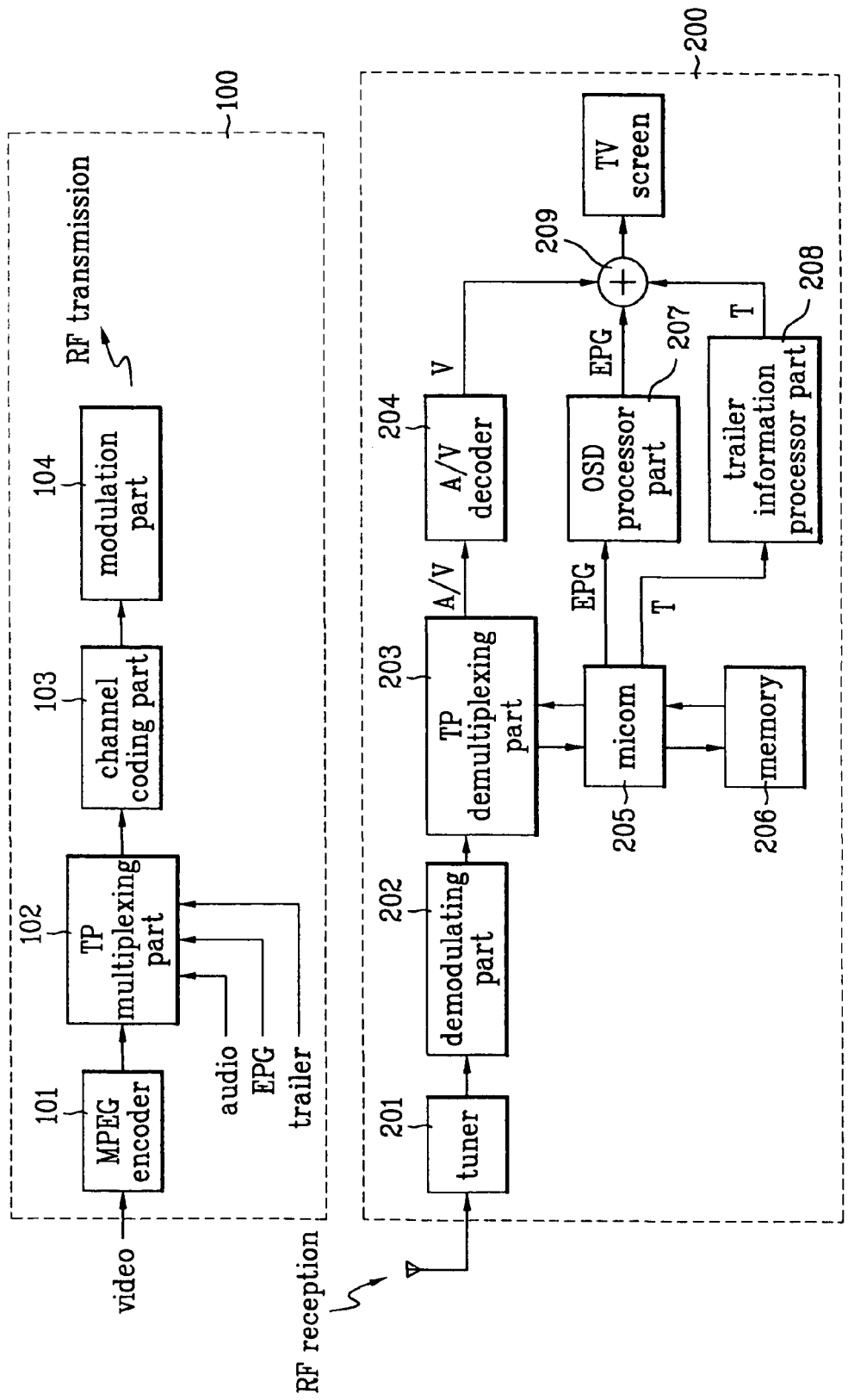

METHOD OF TRANSMITTING/RECEIVING ADDITIONAL INFORMATION

This application claims the benefit of the Korean Application No.P2001-18356 filed on Apr. 6, 2001, which is hereby incorporated by reference.

BACKGROUND OF THE INVENTION

1. Field of the Invention

The present invention relates to a digital TV (DTV), and more particularly, to a method of transmitting/receiving additional information in a digital TV servicing an electronic program guide(EPG).

2. Discussion of the Related Art

Lately, as broadcasting media such as cable TV broadcasting, digital TV broadcasting and the like are diversified, the number of broadcast channels and programs as well as broadcasting stations increases by geometric progression.

Therefore, it is not easy for audiences to select their favorite programs from a number of broadcast channels and programs.

Digital TV (hereinafter abbreviated DTV) provides a program guide or an electronic program guide(hereinafter abbreviated EPG) for the convenience of the audiences.

EPG is the additional information enabling to help the audiences to watch TV more conveniently, whereby the audiences enable to gain the information about the current and coming broadcast programs on TV screen without other guide media such as newspapers and the like.

Moreover, there is PSIP (program and system information protocol) defining both EPG and SI (system information.

PSIP has been proposed as a standard for ATSC (advanced television systems committee) of the digital broadcasting TV.

PSIP transmits and receives A/V data constructed with MPEG-2 video and AC-3 audio formats, and includes various tables enabling to transmit the information about the channels of the respective broadcasting stations as well as the programs of the respective channels.

And, PSIP can support a main function for providing A/V services of the user demand broadcast as well as an additional function of broadcast guide services such as EPG.

In this case, the channel information for the channel selection and another information such as a packet identification number (PID) for the A/V reception are transmitted through a virtual channel table (VCT), while the information such as EPG of the broadcast programs of the respective channels is transmitted through EIT.

Besides, PSIP further includes STT (system time table) for time information, RRT (rating region table) to transmit information about the regions and consultation organs for the program rates, ETT (extended text table) for additional explanation about the channels and broadcast programs, MGT (master guide table) for the management of versions and PIDs of the respective tables, and the like.

Such tables are transmitted by the data structure called sections.

Each of the tables has a basic unit of section, and the combination of at least one of the sections constructs one table.

Yet, EPG has the limited and simple information about the programs, and particularly, the information constructed mainly with characters only.

Hence, the audience anxious to be informed of the contents of a certain program through TV has no other way but to read the corresponding story provided by EPG.

Yet, the story is the character information only, thereby has a limitation in inducing interests of the audiences.

SUMMARY OF THE INVENTION

Accordingly, the present invention is directed to a method of transmitting/receiving additional information that substantially obviates one or more problems due to limitations and disadvantages of the related art.

An object of the present invention is to provide a method of transmitting/receiving additional information enabling to help an audience to select a program by displaying both EPG and a variety of additional information such as program schedules, ads, and the like on a video.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of transmitting/receiving additional information according to the present invention includes the steps of transmitting video, audio, trailer, and EPG (program guide) signals respectively having independent PIDs (packet identification numbers), receiving the transmitted signals and extracting the video, audio, EPG, and trailer signals from the received signals, displaying the extracted EPG, and displaying the trailer signal for a selected broadcast program of the EPG.

Preferably, the trailer is one of a preview and summary for the selected program or a random advertisement.

Preferably, the trailer is displayed as a motion picture or still image.

Preferably, the trailer signal is transmitted through a channel together with the video, audio, and EPG signals or a trailer dedicated channel.

Preferably, the PID of the trailer is added to a table of PSIP (program and system information protocol) so that the trailer signal is linked to a corresponding broadcast program.

In another aspect of the present invention, a method of transmitting/receiving additional information includes the steps of multiplexing together video, audio, trailer, and EPG (program guide) signals respectively having independent PIDs (packet identification numbers), coding and modulating to transmit the multiplexed signals, receiving and demodulating the transmitted signals, extracting video, audio, EPG, and trailer signals from the demodulated signals, displaying the extracted EPG, and displaying a trailer for a selected broadcast program of the EPG.

In a further aspect of the present invention, a method of transmitting/receiving additional information includes the steps of multiplexing together video, audio, and EPG (program guide) signals respectively having independent PIDs (packet identification numbers), coding and modulating the multiplexed signals and a trailer signal having an independent PID and transmitting the coded and modulated signals through different channels, respectively, receiving and demodulating the transmitted signals, extracting the video, audio, and EPG signals from the demodulated signals, displaying the extracted EPG, and displaying a trailer for a selected broadcast program of the EPG.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3 illustrates a block diagram of an additional information transceiver.

DETAILED DESCRIPTION OF THE INVENTION

Figure 1A:
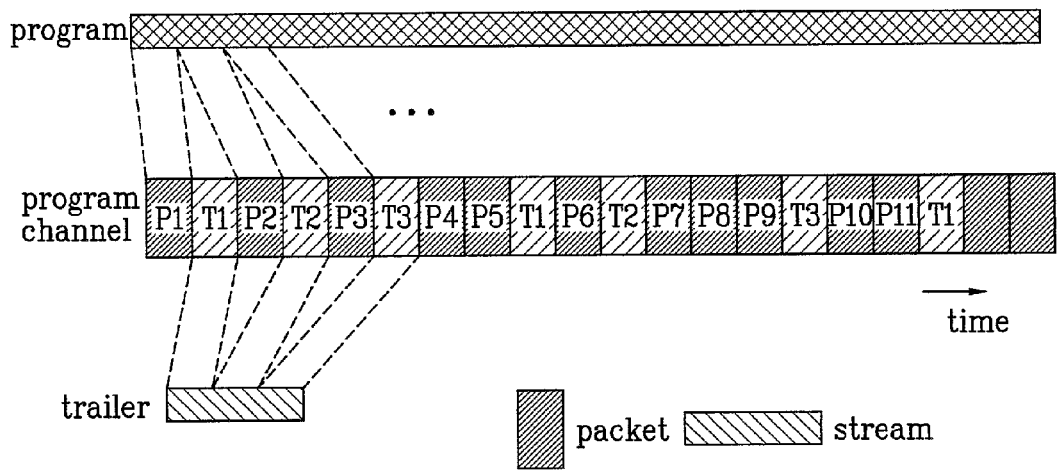
FIG. 1A illustrates a diagram for transmitting a trailer multiplexed with a program according to the present invention.

Reference will now be made in detail to the preferred embodiments of the present invention, examples of which are illustrated in the accompanying drawings. Wherever possible, the same reference numbers will be used throughout the drawings to refer to the same or like parts.

First of all, a trailer in the present invention, which is an MPEG-2 stream connected to one broadcast program, means a simple preview or a summary of each broadcast program.

Meanwhile, the present invention enables to extend trailer ads.

Such a trailer through motion pictures or still image is provided from a transmitting side such as a broadcasting station to a receiving side such as a digital TV (hereinafter abbreviated DTV).

Accordingly, one program according to the present invention is constructed with video/audio/data/trailer.

Namely, the transmitting side such as a broadcasting station multiplexes to transmit the program-related video/audio/data/trailer to the receiving sides such as DTV, a set-top box, and the like.

In this case, the trailer is included in the additional information, and the data is the additional information except the trailer (ex. EPG information).

Moreover, the multiplexed stream is transmitted to the receiving side using UHTTP (unidirectional hyper text transfer protocol), a data carousel system, or the like.

Besides, the transmitting side needs to expand PSIP additionally for transmission so as to inform the receiving side of the information about the trailer.

For this purpose, the trailer like the video/audio/data should have independent PID and is inter-operated with the EPG information.

Namely, there is a transport stream constructing a plurality of programs with one bit stream in the multiplexing system of MPEG, which carries out multiplexing/demultiplexing using a packet system.

In this case, the packet multiplexing, which multiplexes video, audio, data, and trailer, is carried out in manners that the video, audio, data, and trailer are segmented into bit streams, which have predetermined lengths and called packets, respectively. The packets of the video, audio, data, and trailer are switched by adding additional information such as headers and the like thereto, and the switched packets are transmitted by time-division.

In this case, packet identifiers (PID) are given to the headers distinguishing attributes of the video, audio, data, and trailer, respectively.

Thus, the transport stream is divided into a header part and a payload part.

The header part includes information informing the start of signals and a PID number representing what the signal loaded in the payload part is. And, video, audio, data, and trailer signals are loaded on the payload part so as to be transmitted.

In this case, the PID number provides a means for demultiplexing the time-divided signal, whereby the receiving side enables to identify whether the current packet is one of video information, audio information, EPG such as program guide information, trailer.

Meanwhile, in order to link the trailer to the corresponding broadcast program, each trailer PID should be connected to the PSIP table having the EPG information.

For example, a new descriptor relating to the trailer may be defined to use on an EIT table, an ETT table, or the like.

This is for indicating which trailer is linked to the program selected on an EPG screen by the audience as well as linking the selected program to the corresponding trailer.

Namely, once a user selects program-A on the EPG screen, a summary or preview for the program-A should be displayed on a TV screen.

There are various methods for transmitting the above-defined trailer to the receiving side. FIG. 1A explains a method of transmitting a trailer through a channel together with the corresponding program. And, FIG. 1B explains a method of transmitting a plurality of trailers using trailer dedicated transmission channel.

Referring to FIG 1A, when a trailer is transmitted through a channel together with the corresponding program, the trailer is inserted between intervals of the program channel for the transmission without deteriorating a capacity of the entire program channel when MPEG-2 stream for the program is being transmitted.

Such a method is easy to be realized.

Figure 1B:
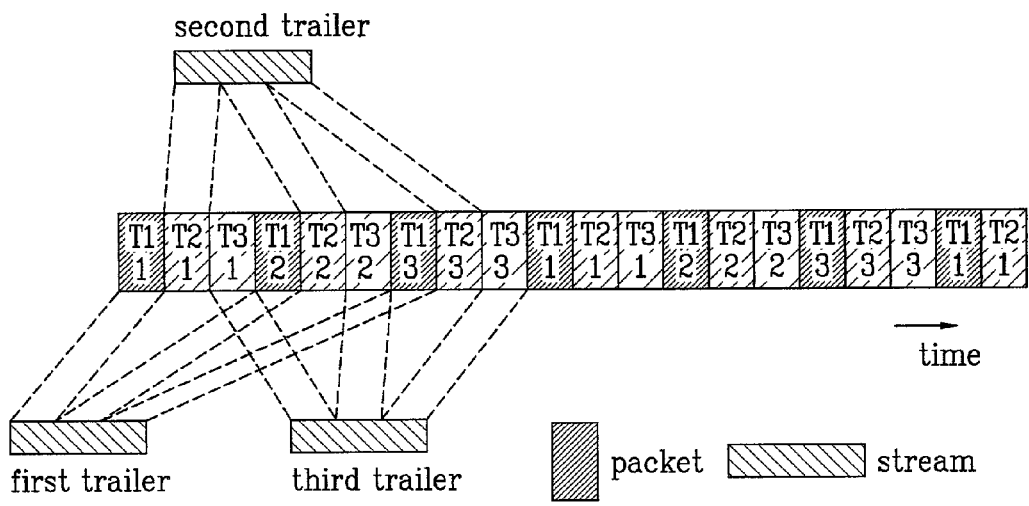
FIG. 1B illustrates a diagram for transmitting trailers through a dedicated channel according to the present invention.

Referring to FIG. 1B, when a trailer dedicated channel is used, a plurality of trailers are transferred through one channel in common.

This method manages all the trailers on one common channel, thereby enabling to extend with ease if the number of the trailers is excessive.

Generally, elementary stream PID for video/audio/data is supposed to be described in a virtual channel table (VCT).

A position of narrating the elementary PID is a descriptor field in VCT, and the elementary PID is described using service_location_descriptor.

Therefore, when the trailer is transmitted together with the corresponding program in the present invention, stream_type is allotted to service_location_descriptor as a private value called "trailer service data" so as to be transmitted.

Moreover, when the trailers are transmitted through the trailer dedicated channel, trailer_location_descriptor like the concept of service_location_descriptor is defined. And, major channel number, minor channel number, and elementary PID are described on this field so as to transmit the trailers.

For example,

| trailer_location_descriptor() | { | |
|---|---|---|
| descriptor_tag | 8 | 0x?? |
| descriptor_length | 8 | uimsbf |
| reserved | 3 | '111' |
| PCR_PID | 13 | uimsbf |
| reserved | 4 | '1111' |
| major_channel_number | 10 | uimsbf |
| minor_channel_number | 10 | uimsbf |
| reserved | 3 | '111' |
| elementary_PID | 13 | uimsbf |
| } | | |

Figure 2A:
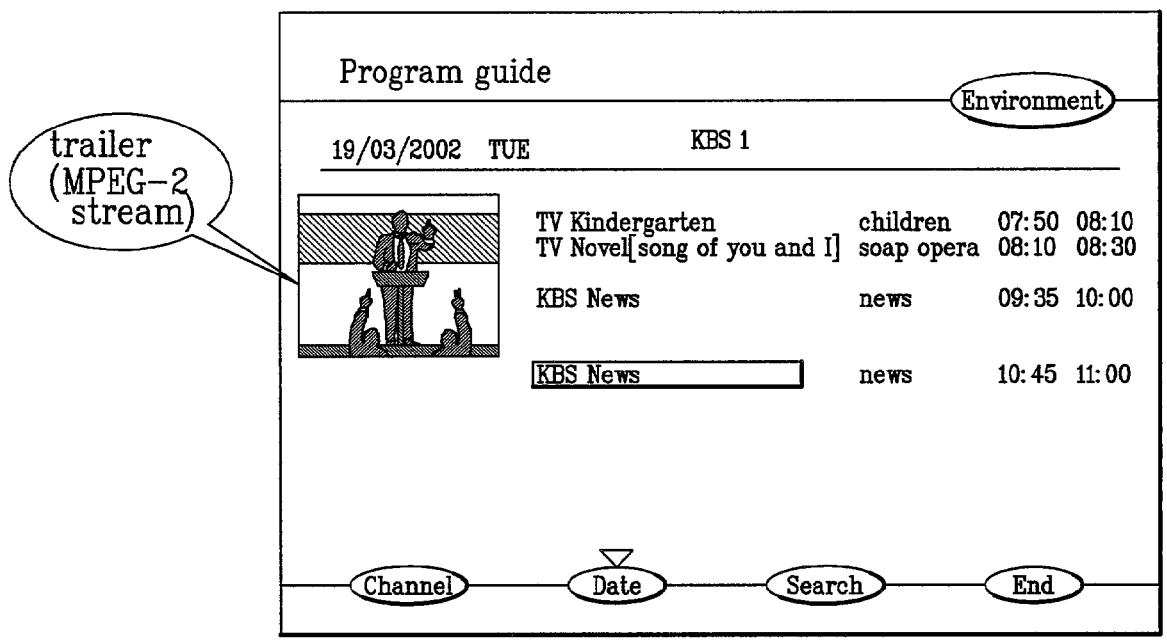
FIG. 2A illustrates a diagram of an example that a trailer is displayed on a portion of an EPG screen according to the present invention.
Figure 2B:
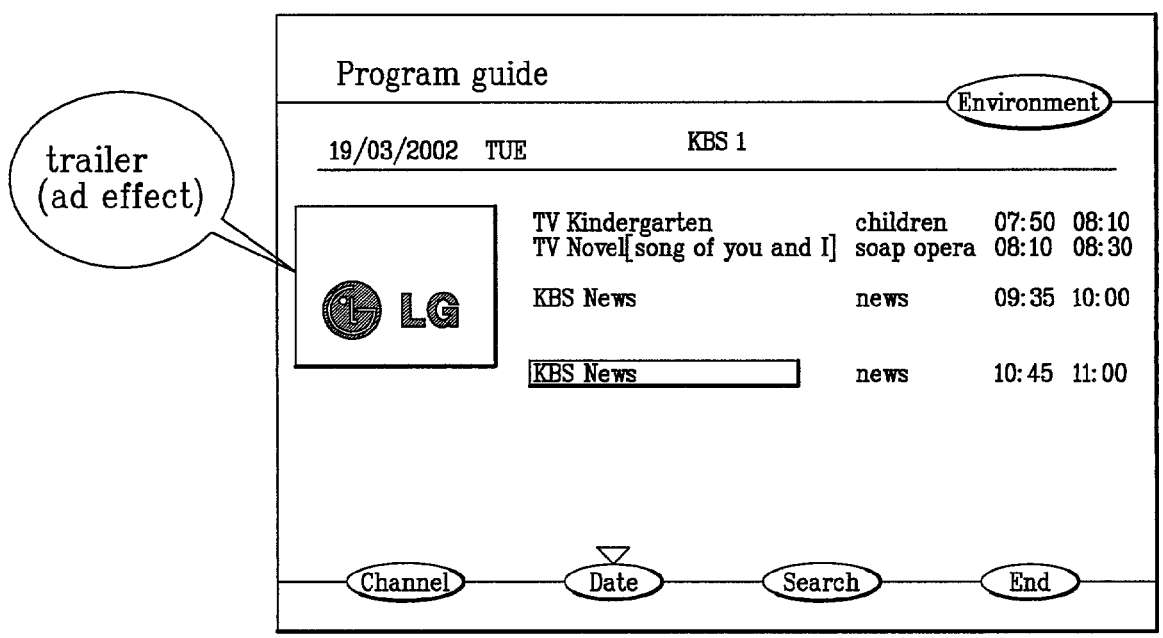
FIG. 2B illustrates a diagram of another example that a trailer is displayed on a portion of an EPG screen according to the present invention.

FIG. 2A and FIG. 2B illustrate states when trailers are realized so as to be linked to EPG, respectively.

Referring to FIG. 2A, when a specific program is selected from an EPG service, an audience is provided visually with a summary or preview of the selected program.

In this case, the trailer information is replaced by a stream so that a still image is displayed, or an effect of motion pictures is brought about by displaying consecutively picture images by frame unit.

In this case, a quantity of the trailer information becomes less than the stream data, thereby enabling to send more various pictures.

Moreover, if the summary or preview for the selected program fails to be provided with, the audience selects the corresponding program so as to enable to display, as shown in FIG. 2B, the ads and the like.

FIG. 3 illustrates a block diagram of an additional information transceiver, in which, for instance, a transmitting side 100 is a broadcasting station and a receiving side 200 is one of a DTV receiver or set-top box.

Referring to FIG. 3, the transmitting side 100 is constructed with an MPEG encoder 101 encoding an input video signal into an MPEG algorithm, a transport multiplexing part 102 multiplexing audio, data, and trailer to the MPEG encoded video signal, a channel coding part 103 channel-coding the multiplexed signal, and a modulating part 104 modulating the channel-coded signal by a setup system. If the DTV follows U.S. standard, a vestigial sideband (VSB) modulation can be used.

Meanwhile, the receiving side 200 is constructed with a tuner 201 tuning a demand channel frequency only among RF signals transmitted from the transmitting side 100, a VSB demodulating part 202 carrying out demodulation on the channel frequency tuned by the tuner 201, a TP demultiplexing part 203 separating video/audio/data/trailer from the VSB-demodulated signal, an A/V decoder 204 decoding the separated video/audio signal, a microcomputer 205 controlling storage and display of the separated data/trailer, a memory 206 storing the data/trailer inputted through the microcomputer 205, an OSD processor part 207 receiving EPG information from the data stored in the memory 206 so as to handle OSD (on screen display) by a control of the microcomputer 205, a trailer processor part 208 receiving the trailer stored in the memory 206 so as to display by a control of the microcomputer 205, and an adder 209 adding outputs of the A/V decoder 204, OSD processor part 207, and trailer processor part 208 so as to output the added output to a TV screen.

In the above-constructed present invention, the MPEG encoder 101 of the transmitting side 100 encoding the input video signal into the MPEG algorithm so as to output the encoded signal to the TP (transport) multiplexing part 102.

The TP multiplexing part 102 multiplexes the video signal, audio signal, data, and trailer, and then outputs the multiplexed signal as a packet form to the channel coding part 103.

In this case, it is able to transmit the trailer using the channel through which the corresponding program is transferred like FIG. 1A or the dedicated channel through which the trailer is transferred only like FIG. 1B.

The trailer will be channel-coded and modulated separately without being multiplexed with other signals if transferred through the dedicated channel.

FIG. 3 illustrates an embodiment of multiplexing a trailer on a channel on which video, audio, and data information are loaded so as to transmit.

The channel coding part 103, as shown in FIG. 3, carries out channel coding on an output of the transport multiplexing part 102 so as to transmit the channel-coded signal to the VSB modulating part 104. And, the VSB modulating part 104 carries out VSB modulation on the channel-coded signal so as to transmit as an RF signal.

Namely, when a signal is modulated in amplitude, VSB modulation is a method of modulating a rest part when one side band signal of two sidebands occurring up and down centering around a carrier wave is greatly attenuated. A terrestrial wave of U.S. standard for DTV adopts 8 VSB modulation.

Meanwhile, the tuner 201 of the receiving side 200 tunes the demand channel frequency only from the transmitted RF signal so as to output the tuned signal to the demodulating part 202.

The demodulating part 202 using VSB carries out VSB modulation so as to provide a transport stream, and then outputs the transport stream to the demodulating part 203.

The transport demultiplexing part 203 checks PID of the time-multiplexed transport stream so as to separate a video signal stream, an audio signal stream, a data signal stream, and a trailer signal stream from each other.

In this case, the separated video signal stream and the audio signal stream are outputted to the A/V decoder 204.

The A/V decoder 204 decodes the compressed video signal stream using MPEG algorithm and the audio signal stream using AC-3 algorithm so as to restore to their original signals, and then outputs the restored signals through the adder 209.

Meanwhile, the data signal stream and the trailer signal stream separated in the demultiplexing part 203 become databases in the memory 206 through the microcomputer 205.

In this case, if an audience selects EPG information, the EPG information stored in the memory 206 is OSD processed through the OSD (on screen display) processor part 207, and then outputted to the adder 209.

And, the adder 209 synthesizes the OSD-processed EPG information and the video signal decoded in the A/V decoder 204 so as to display them on a TV screen.

If the audience selects a specific program so as to watch a summary or preview of the specific program, the trailer signal of the corresponding program in the memory 206 is displayed on the TV screen through the trailer signal processor part 208 and adder 209. Namely, the summary or preview of the corresponding program, as shown in FIG. 2A, is displayed as a motion picture.

In this case, the trailer is displayed on a portion of the EPG screen. Yet, the trailer is switched to a main screen by the audience's selection so as to be displayed.

Moreover, the trailer information is replaced by a stream so that a still image is displayed, or picture images are consecutively displayed by frame unit so as to bring about a motion picture effect.

In this case, the quantity of the trailer information is less than the stream data, thereby enabling to send more various pictures.

Besides, if there is no summary or preview of the corresponding program, specific commercial and the like, as shown in FIG. 2B, may be displayed when the audience selects the corresponding program.

Accordingly, when the audience selects a specific program on an EPG screen, the method of transmitting/receiving additional information according to the present invention displays a summary or preview of the selected program. Therefore, the transmitting side such as a broadcasting station enables to inform the audiences of the corresponding program of the broadcasting station, and the audiences are helped to select programs through program previews or summaries.

Moreover, application of the present invention enables to send simple ads through trailer(s) as well as the trailer information relating to the program.

It will be apparent to those skilled in the art than various modifications and variations can be made in the present invention. Thus, it is intended that the present invention covers the modifications and variations of this invention provided they come within the scope of the appended claims and their equivalents.

What is claimed is:

1. A method of transmitting/receiving a specific trailer using an electronic program guide (EPG) identifying a plurality of broadcast programs, the method comprising:

multiplexing a video signal, an audio signal, and an EPG signal, each signal having an elementary packet identifier, the EPG signal including a trailer location descriptor;

encoding and modulating the multiplexed signals and coding and modulating a plurality of trailer signals, each trailer signal having an elementary packet identifier, to transmit the multiplexed signals and trailer signals through respective channels;

receiving the respectively transmitted signals by decoding and demodulating the received signals according to the corresponding elementary packet identifier and the trailer location descriptor, to extract each of the multiplexed signals and to store in memory the extracted EPG signal and the demodulated trailer signals;

displaying the stored EPG signal; and selecting for additional display one of the plurality of trailer signals by selecting one of the plurality of broadcast programs of the displayed EPG signal so as to retrieve from memory the selected trailer signal based on the trailer location descriptor;

wherein the selected trailer signal is processed via a trailer information processor part, to be added to the displayed EPG signal;

wherein the trailer location descriptor in the following order a descriptor tag field of 8 bits, a descriptor length field of 8 bits, a reserved field of 3 bits, a PCR PID field of 13 bits, a reserved field of 4 bits, a major channel number tag field of 10 bits, a minor channel number field of 10 bits, a reserve field of 3 bits and an elementary PID field of 13 bits, the fields of the trailer location descriptor being in said order.

2. The method as claimed in claim 1, wherein the additionally displayed trailer corresponds to the selected broadcast program.

3. The method as claimed in claim 2, wherein the corresponding trailer is a preview of the selected broadcast program.

4. The method as claimed in claim 2, wherein the corresponding trailer is an advertisement.

5. The method as claimed in claim 1, wherein the additionally displayed trailer is displayed as a motion picture.

6. The method as claimed in claim 1, wherein the additionally displayed trailer is displayed as a still image.

7. The method as claimed in claim 1, wherein the EPG signal is transmitted according to program and system information protocol and includes a table in which the elementary packet identifiers of the trailer signals are arranged to link each trailer signal to one broadcast program.

8. The method as claimed in claim 1, wherein the trailer signals are transmitted via a dedicated channel.

* * * * *